United States Patent [19]

Hones et al.

[11] Patent Number: 5,404,062
[45] Date of Patent: Apr. 4, 1995

[54] MAGNETIC LEVITATION DEVICE AND METHOD

[75] Inventors: Edward W. Hones, Los Alamos, N. Mex.; William G. Hones, Seattle, Wash.

[73] Assignee: Creative Gifts, Inc., Seattle, Wash.

[21] Appl. No.: 197,845

[22] Filed: Feb. 17, 1994

[51] Int. Cl.$^6$ .............................................. H02K 7/09
[52] U.S. Cl. .................................................. 310/90.5
[58] Field of Search ................................ 335/302–306; 310/90.5; 446/255–264, 129–139; 33/316–330, 355 R–355 D; 104/283

*Primary Examiner*—Leo P. Picard
*Assistant Examiner*—Raymond M. Barrera
*Attorney, Agent, or Firm*—Wigman, Cohen, Leitner & Myers

[57] ABSTRACT

A magnetic levitation device and method of levitating a magnet without mechanical restraining elements are disclosed. The levitation device comprises a first magnet with a polygonal, preferably square, periphery and a substantially planar upper surface magnetized normal thereto and a second magnet with an apparatus to rotate or spin the same. The second magnet is rotated or spun on a lifter plate disposed on the upper surface of the first magnet with like polar orientations of the magnets in confronting relation. When the lifter plate is raised above the first magnet the spinning second magnet levitates above the first magnet and the lifter plate and the lifter plate is removed from between the first and second magnets. The weight of the second magnet may be varied to change the height above the first magnet at which the second magnet levitates.

20 Claims, 6 Drawing Sheets

MAGNETIC LEVITATION DEVICE AND METHOD

FIELD OF THE INVENTION

The present invention relates to levitation devices and methods and more particularly to the levitation or suspension of a permanent magnet in a magnetic field produced by another magnet (either permanent or electromagnetic) using no mechanical restraints or supports.

BACKGROUND OF THE INVENTION

Magnets, both permanent magnets and electromagnets, find a wide variety of uses, both practical and as entertainment devices. The poles of magnets have been named the north pole and the south pole, the north pole being the one that points northward in the Earth's magnetic field, i.e., the magnetic north-seeking pole. It is, of course, well known that like poles, i.e., two north poles, repel one another and unlike poles, i.e., a north pole and a south pole, attract one another.

This phenomenon has been used to levitate one magnet above another and offers the possibility of substantially reduced friction. Magnetic levitation of trains, for example, is one practical application of the phenomenon. However, in such a levitation application, highly sophisticated control devices are required for controlling the magnetic fields of electromagnets to overcome the inherent instabilities of the repulsion forces of two like magnetic poles. In a simple levitation system wherein one pole of a first permanent magnet is attempted to be suspended above a like pole of a second permanent magnet, the inherent instability of such a system results in the flipping over of the first magnet so that the unlike poles attract and are brought together into a stable configuration.

A number of simple levitation systems have been devised which employ specially configured permanent magnet arrangements intended to minimize the instability associated with magnetic levitation. In U.S. Pat. No. 2,323,8937 to Neal, for example, there is disclosed a magnetic system having a base magnet comprising a circular disk in which a first plurality of cylindrical magnets is disposed in a circular array about the axis of the circular disk. An upper magnet member comprising a spherical segment in which a second plurality of cylindrical magnets is disposed in a circular array of smaller diameter than the diameter of the circular array of the base magnet. The first plurality of magnets is disposed with like (north) poles and longitudinal axes directed vertically upwardly or inclined slightly toward the axis of the circular disk. The second plurality of magnets is disposed with like (north) poles and longitudinal axes directed vertically downwardly or inclined at the same inclination as the first plurality of magnets. This arrangement of the base magnet is said to produce an inverted magnetic field cone which embraces the smaller diameter magnetic field of like polarity of the upper magnet and thereby is said to stabilize the levitation system.

U.S. Pat. No. 4,382,245 to Harrigan discloses another simple magnetic levitation system which utilizes a dish-shaped lower magnet to magnetically support or levitate a magnetic top spinning coaxially above the lower magnet. The dish-shaped or concave surface of the lower magnet is said to produce radially inwardly directed lines of magnetization which, together with the gyroscopic effect of rotation of the magnetic top, provide stabilization of the levitation system. The Harrigan patent discloses another embodiment in which stabilization is said to be provided by a combination of the concave lower magnet surface and a pendulum effect resulting from a non-magnetic mass supported below the lower magnet on an arm extending from the upper magnet through a central bore in the lower magnet. Other embodiments are disclosed in which the lower field is not provided by a dish-shaped magnet but is provided by a plurality of cylindrical magnets arranged similarly to the arrangement of the aforementioned Neal patent.

SUMMARY OF THE INVENTION

The present invention is directed to a magnetic levitation device that accomplishes stable, unrestrained levitation of one magnet above another magnet by utilizing a previously unrecognized characteristic of the magnetic field above a uniformly magnetized surface and by incorporation of a rotational motion of the levitated magnet. Although the magnetic levitation device of the present invention may have other applications not specifically described herein, it is intended to provide an educational or amusement device that may be readily manufactured at low cost and operated simply, reliably and reproducibly with minimal instruction.

The invention described herein makes use of a uniformly magnetized flat or substantially planar magnetic base above which is caused to float or levitate a spinning magnetic top comprising a flat ring magnet, a nonmagnetic spindle and one or more nonmagnetic washer-shaped weights. Both the base magnet and the magnet of the top are preferably sheet-like materials magnetically polarized normal to their horizontal or flat surfaces and their magnetic fields are arranged in opposition. Sheet-like materials magnetized in this way are referred to as magnetic shells. The magnetic strength, S, of a shell is defined as the magnetic moment per unit area of its surface, i.e., the number of unit poles per unit area times the thickness of the shell. The magnetic field of a uniformly magnetized shell is the same as would be produced by an electric current flowing around the periphery of the shell, the current intensity, i, in abamperes, being numerically the same as the strength, S, of the shell. All shells of the same uniform strength and the same outer periphery give rise to the same field at all outside points. In other words, the profile or shape of the surface of the shell is immaterial. Making the surface of the base magnet concave instead of flat does not provide a magnetic centering force above the base magnet.

A previously unrecognized characteristic of the magnetic field above a magnetic shell is that the shape of the outer periphery of a shell affects the stability of a levitation system using the shell. In particular, a magnetic shell with a polygonal shaped periphery, especially a rectangular or a square shaped periphery, has a region located a few centimeters above the surface of the shell and along the diagonals of the polygonal shape where the magnetic field gradients are such as to provide both lifting ($dH_x dz$) and centering ($dH_x/dz$) forces on a magnetic dipole positioned in that region. Other non-polygonal shapes, such as circular, elliptical, etc. do not appear to provide a region where both lifting and centering forces exist.

With the foregoing and other advantages and features of the invention that will become hereinafter apparent,

DETAILED DESCRIPTION OF THE INVENTION

Figure 1:
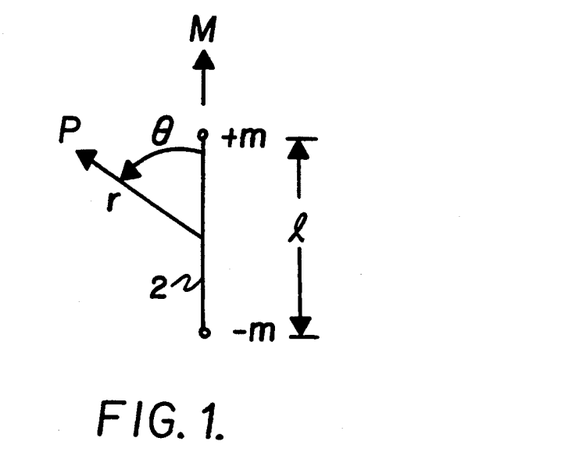
FIG. 1 is a graphic illustration of a magnetic dipole +m, −m of length 1 and the coordinates r and ⊖ used to define the location of a point P in the magnetic field around the dipole.

While the present invention is not intended to be limited thereby, the following explanation of the operation of the invention will aid in understanding the invention. Referring first to FIG. 1, there is graphically illustrated a magnetic dipole 2 of length 1 having a north pole (+m) and a south pole (−m). The dipole 2 is said to have a magnetic moment M equal to the product ml. Magnetic moment M is a vector having a direction from −m to +m along the axis of dipole 2. The magnetic field surrounding the magnetic dipole is given by:

$$H_r = 2M \cos \ominus / r^3 \qquad (1)$$

$$H \ominus = M \sin \ominus / r^3 \qquad (2)$$

where M is the magnetic moment of the dipole;
r and ⊖ define the point in space relative to the dipole at which the field is measured; and
$H_r$ and $H\ominus$ are the components of the field, in gauss, in the directions of increasing r and increasing ⊖.

Equations (1) and (2) above also define the magnetic field produced by a circular loop of electric current where M is the product of the current i in the loop and the area A of the loop and is known as the magnetic moment of the current loop.

Figure 2:
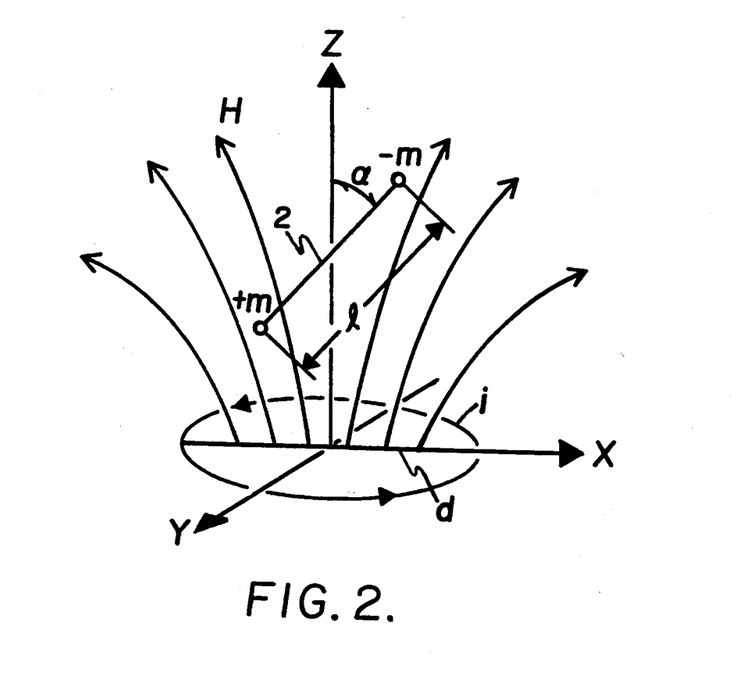
FIG. 2 is a graphic illustration of the magnetic field of a Circular current loop with a magnetic dipole +m, −m located near the axis of symmetry of the field.

It has been very difficult to achieve levitation of one permanent magnet above another permanent magnet without using some form of mechanical restraint to keep the levitated magnet stable, i.e., prevent it from sliding sideways and/or flipping over. This situation is illustrated in FIG. 2. A circular loop of current, i, lies in the x-y plane. The magnetic field produced by the current is shown by magnetic field lines emerging along a diameter d of the loop i. (By convention the direction of the magnetic field is the direction of the force the field exerts on a north (+) pole). The field lines diverge (i.e., the field becomes weaker) with increasing height above the current loop i. A dipole 2 (+m, −m) is shown located near the axis of symmetry of the field and is tilted by an angle, α, away from the vertical. The field causes an upward force on +m and a downward force on −m. These forces produce a torque tending to rotate the dipole clockwise. The torque T is, approximately:

$$T = H_z ml \sin = H_z M \sin \alpha \qquad (3)$$

Note that the torque increases as α increases. The dipole 2 is unstable in the position shown and will flip over, putting the south pole (−m) downward to achieve a stable configuration. The dipole 2 also experiences a net upward force when oriented as shown because in the upwardly decreasing field, the upward force on +m is greater than the downward force on −m. The net upward force is given by:

$$F_z = M \cos \alpha \, dH^x/dz \qquad (4)$$

There is also a net sideways force in the X direction given by:

$$F_x = M \cos \alpha \, dH_x/dz \qquad (5)$$

If $H_x$ increases with z, the net sideways force will be directed toward the axis of the field, i.e., there will be a centering force, keeping the dipole from sliding sideways out of the field. The upward and sideways forces, or translational forces, on the dipole are proportional to the spatial rate of change (i.e., the gradient) of the field, not to the magnitude of the field. In a perfectly uniform field, the dipole 2 would experience no translational force even if the field were very intense; it would experience only the torque.

Figure 3:
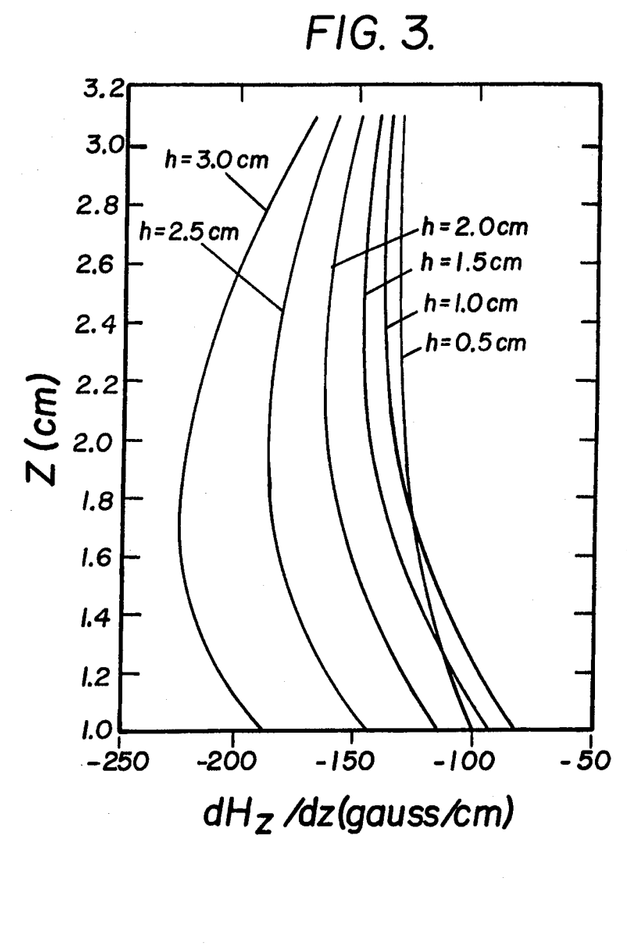
FIG. 3 is a graph showing the calculated magnitudes of the vertical gradient ($dH_x/dz$) of the horizontal component ($H_x$) of the magnetic field versus the distance (z) above a 10 cm square permanent magnet at increasing distances (h) from the central axis of the magnet along a diagonal of the square.
Figure 4:
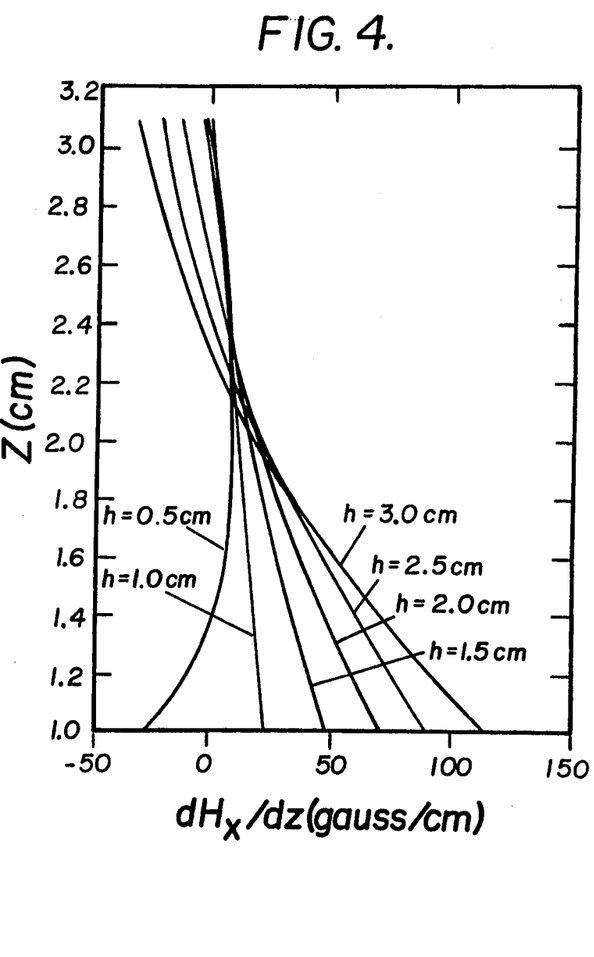
FIG. 4 is a graph showing the calculated magnitudes of the horizontal component of the magnetic field gradient ($dH_x/dz$) in the vertical direction (z) above a 10 cm square permanent magnet at increasing distances (h) from the central axis of the magnet along a diagonal of the square.

According to the present invention, a previously unrecognized characteristic of the magnetic field above a magnetic shell is exploited, namely, that there can be a region a few centimeters above the surface of the shell where the gradients are such as to provide both a lifting ($dH_z/dz$ negative a force) and a centering ($dH_x/dz$ positive a force) on a magnetic dipole. This characteristic is illustrated in FIGS. 3 and 4 with respect to a 10 cm square magnetic shell. In those Figures, curves showing $dH_z/dz$ (FIG. 3) and $dH_x/dz$ (FIG. 4) are plotted versus height z for points spaced 0.5 cm apart along a diagonal of a 10 cm square magnetic shell of strength 780 unit poles per $cm^2$. In FIG. 3 $dH_z/dz$ reaches a maximum negative value at all radial locations, this maximum value being greater and its vertical location being lower at increasing distances from the center of the square (h=0.0 cm). As shown in FIG. 4, the $dH_x/dz$ curves all have positive, i.e., centering, values at vertical distances below about 2.3 cm along the diagonals of the square.

Now, assume that a dipole, such as a small, thin ring magnet magnetized through its thickness, is raised up (increasing z) from the magnetic shell along the axis thereof. The upward force on the magnet increases until the peak negative gradient $dH_z/dz$ is reached, after which the force decreases. The peak $dH_z/dz$ for each distance h marks the height where the maximum weight dipole can be levitated against gravity. A dipole having a weight somewhat less than this maximum would be lifted by the magnetic field up past the peak $dH_z/dz$ and then would be levitated some small distance above that point. If $dH_x/dz$ is negative at that point, e.g., $z > 2.3$ cm in FIG. 3, the dipole will slide sideways out of the field because of the absence of a positive centering force or field along the diagonal of the base magnet. Thus, the region of possible stable levitation is below $z > 2.3$ cm, and the curves of FIGS. 3 and 4 suggest that the inner radius of the ring magnet should be no less than about 2 cm and the outer radius could be as much as 3 cm. With those dimensions, the ring would float and be centered (i.e., would not slip sideways out of the field).

The calculated magnetic field of a circular magnetic shell results in no overlap of the centering region and the maximum negative $dH_z/dz$, that is, the limiting height of the centering region (i.e., the height where $dH_x/dz$ changes from positive to negative) lies below the peak ($dH_z/dz$ negative) force at all radial distances corresponding to distance h. Thus, levitation of a permanent magnet over a circular base permanent magnet is not possible. Examination of a permanent magnet of other shapes, e.g., triangular, x-shaped, has shown that the square is near the optimal shape.

Even though, potentially and theoretically, a ring magnet will levitate and stay centered above the 10 cm square magnetic shell base discussed above, if left unrestrained the ring magnet will flip over and fall to the base magnet. The restraint to prevent this lies in spinning the ring magnet about its axis and relying on gyroscopic action to keep it from flipping. If the ring magnet is spun faster than a certain angular velocity it will spin upright above the base without wobbling. As its speed decreases due to air friction, the ring magnet will begin to nutate and precess until it eventually flips over. The critical rotation speed above which the ring magnet will levitate in a stable condition and below which it will start nutation is given by:

$$\Omega^2 = 4MHI_x/I_z^2 \qquad (6)$$

where
- $\Omega$ = spin rate (radians/sec);
- M = magnetic moment of the ring magnet;
- H = intensity of the magnetic field produced by the base;
- $I_x$ = moment of inertia of the ring magnet about its diameter, $I_x = M(r_1^2 + r_2^2)/4$;
- $I_z$ = moment of inertia of the ring magnet about its axis of symmetry, $I_z = M(r_1^2 + r_2^2)/2$; and
- $r_1$ and $r_2$ are the inner and outer radii of the magnetized ring. For the dimensional parameters used herein to describe the present invention, spin rates of about 20 revolutions/sec are required to prevent the ring magnet from flipping over.

Figure 5:
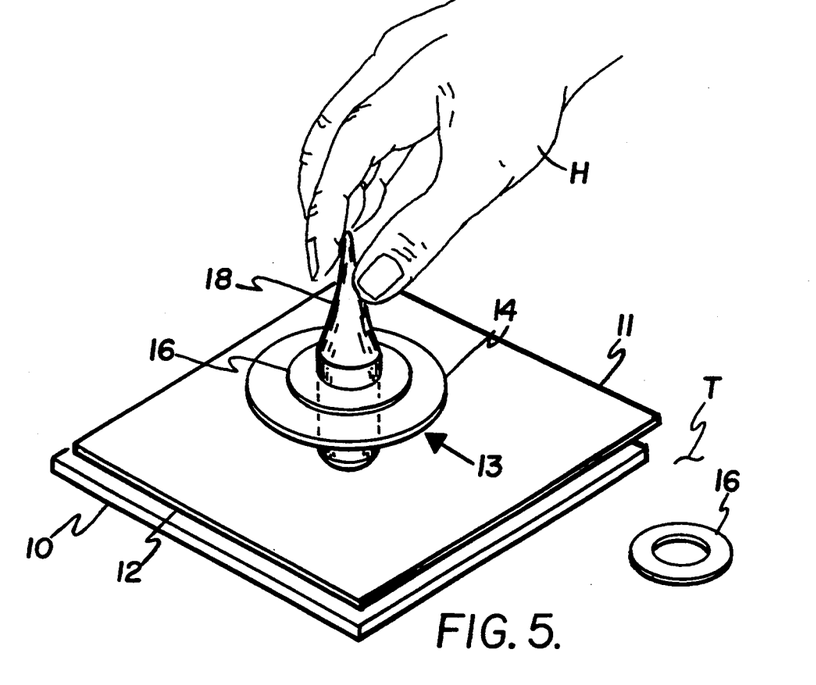
FIGS. 5-9 are perspective views showing one embodiment of the magnetic levitation device of the present invention and the method steps in operating the device of the invention.

A preferred embodiment of the invention is shown in FIG. 5. A first or base ceramic magnet 10 having a square periphery 10 cm on a side and a thickness of about 0.7 cm is disposed horizontally on a surface T. Magnet 10 is magnetized normal to its large surface area with (for description purposes) its north (+) pole oriented upwardly. A non-magnetic lifter plate 12, such as a transparent plastic sheet, rests on the base magnet 10 with an edge 11 extending beyond the base magnet 10. On the lifter plate 12 a top 13 is held by the hand H of a user for operation in the manner described hereinafter. Top 13 comprises a second magnet, such as a ceramic ring magnet 14 with (for description purposes) its north (+) pole oriented downwardly toward the like north pole of the first or base magnet 10. A spindle 18, preferably made of a non-magnetic material, is fitted tightly into the central hole of ring magnet 14 for manually imparting spin to the ring magnet 14. One or more non-magnetic washers 16 are placed over the spindle 18 and fit snugly on the spindle 18 in the manner shown in FIG. 5. Washers 16 are used for weight adjustment of the magnetic top 13 as described in more detail hereinafter. Top 13 is held against the lifter plate 12 above the geometric center G of base magnet 10 and is spun, either by hand or by another appropriate mechanism, such as a cord.

Figure 6:
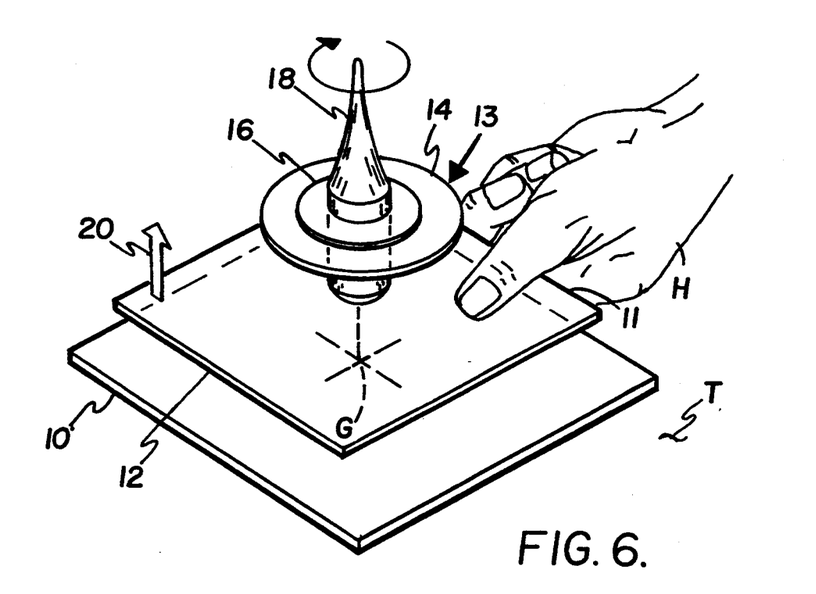
Figure 8:
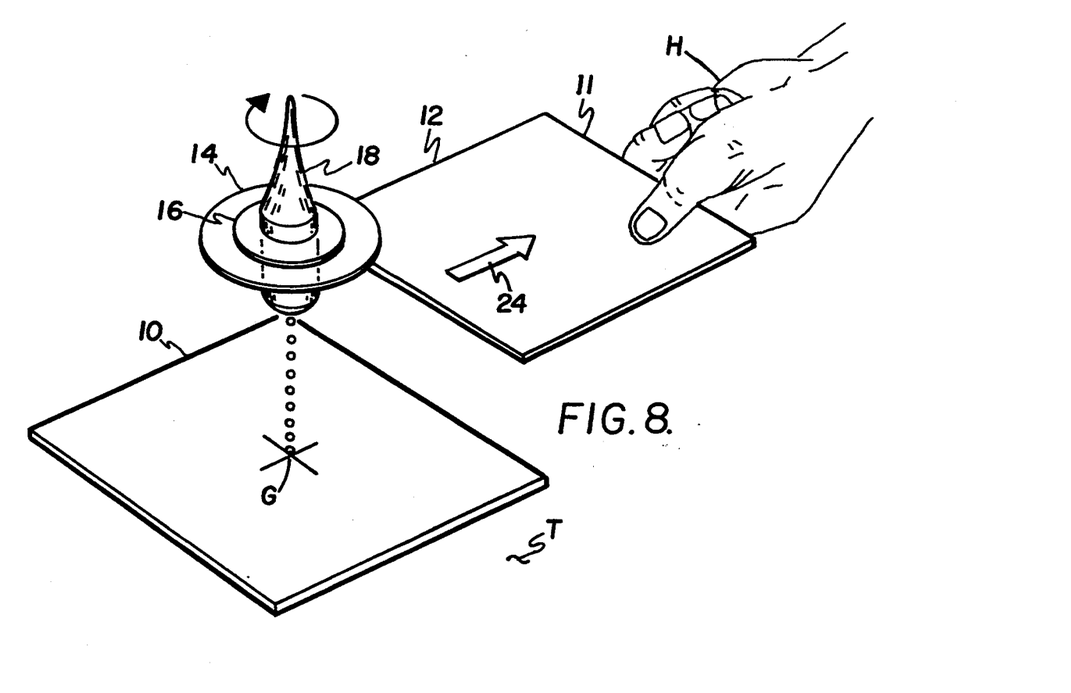
Figure 9:
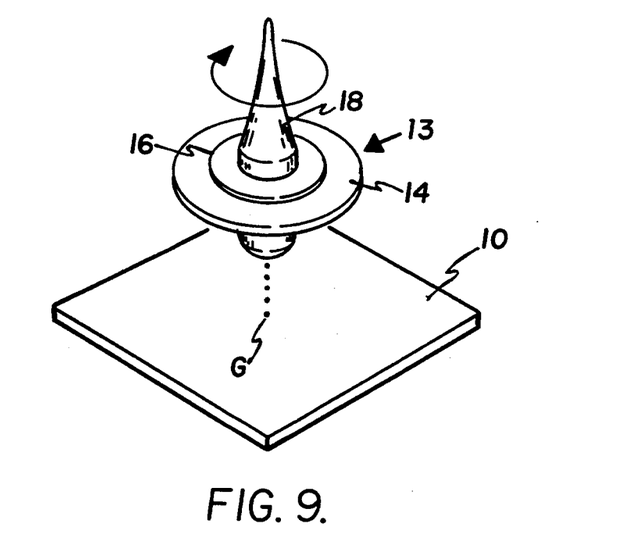

Referring now to FIG. 6 which shows top 13 spinning clockwise, the user grips and raises lifter plate 12 vertically upwardly in the direction of arrow 20. The user lifts the plate 12 slowly by hand until the spinning top 13 approaches the height of maximum negative gradient of the vertical component of the magnetic field. Now referring to FIG. 7, the top 13 has passed through the height of maximum negative gradient ($dH_z/dz$) which causes it to lift or levitate upwardly in the direction of arrow 22 off the surface of lifter plate 12. As shown in FIG. 8, the lifter plate 12 may then be removed, e.g., in the direction shown by arrow 24. The spinning top 13 will remain levitating or floating above the geometric center G of base magnet 10 as shown in FIG. 9 until the rotation rate of the top 13 drops below that which will maintain the system stable.

Figure 7:
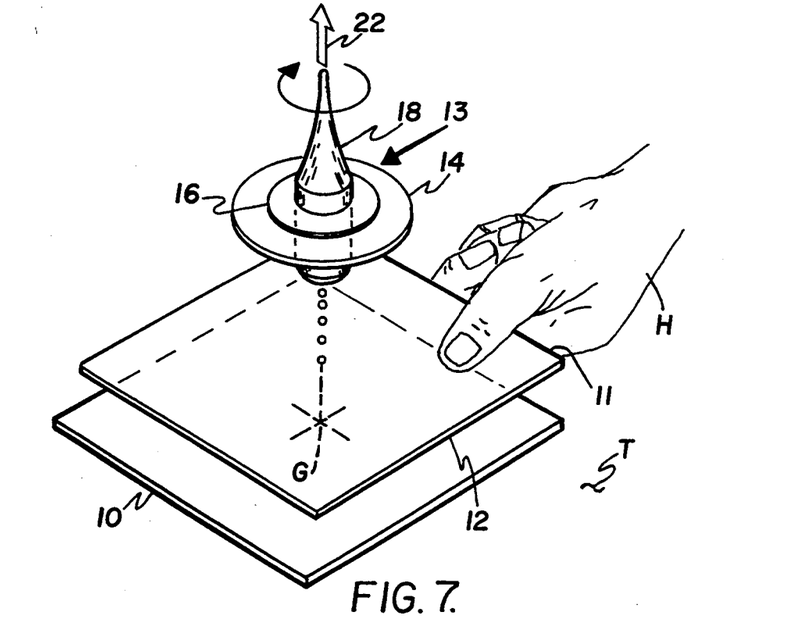

If the top 13 does not lift itself off the lifter plate 12 as shown in FIG. 7, it is too heavy and one or more washers 16 should be removed before the procedure is repeated. If the top 13 suddenly jumps off the lifter plate 12 becomes unstable and falls, the top is too light and one or more washers 16 should be added to the spindle 18 before the procedure is repeated. When the top is correctly weighted, it will rise gently off the lifter plate 12 as the peak negative $dH_z/dz$ is approached and levitate. In actual operation, the top 13 will levitate or float for several minutes during which time it precesses, nutates and moves gently up-and-down and from side-to-side until it slows and falls onto the base magnet.

Figure 10:
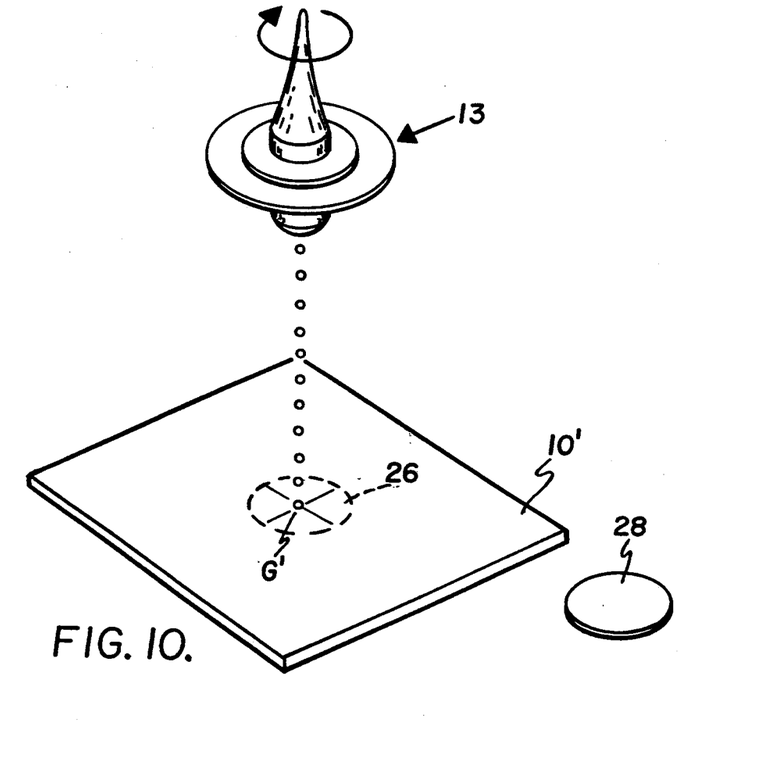
FIG. 10 is a perspective view of other embodiments of the magnetic levitation device of the present invention.

Further embodiments of the invention are illustrated in FIG. 10. These embodiments are substantially the same as the embodiment shown in FIGS. 5–9 except that the height at which the top 13 levitates can be increased by as much as 100%. This is accomplished by weakening the magnetic field at the geometric center G' of the base magnet 10'. A weakened magnetic field at the center G' may be achieved either by cutting a central hole 26 (shown in dashed lines) in the base magnet 10' or by mounting a magnet disk 28 of opposite polarity, i.e., with its south (−) pole oriented upwardly over the geometric center G' of the base magnet 10'. Disk 28 may be adhesively bonded or otherwise affixed to magnet 10'.

Figure 11:
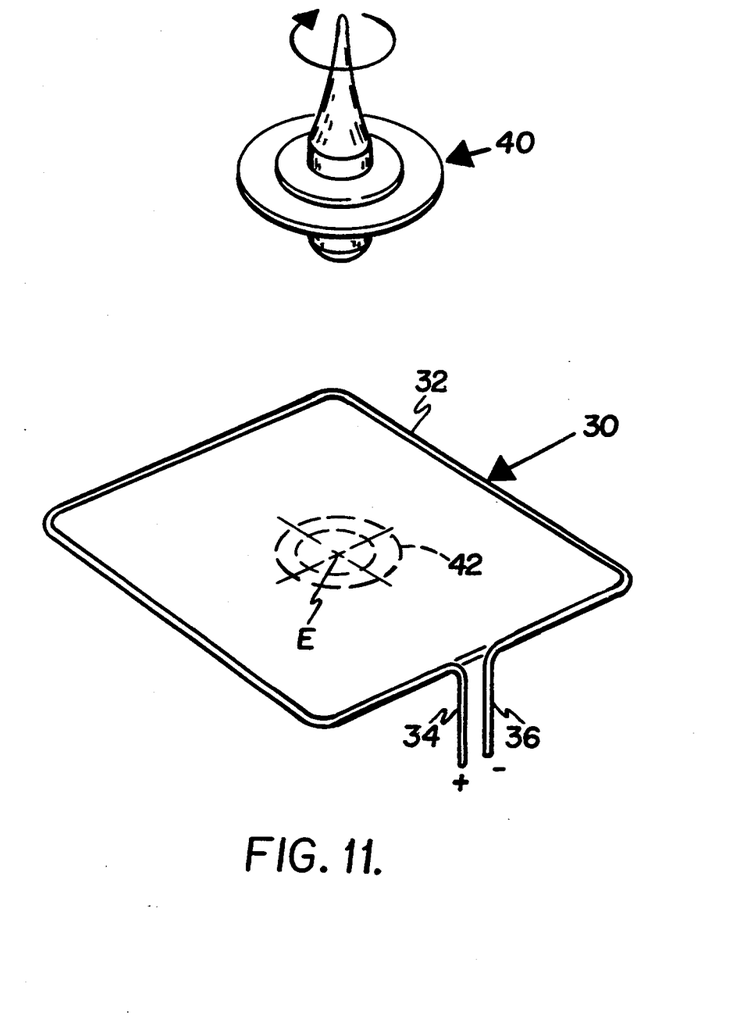
FIG. 11 is a perspective view of still other embodiments of the magnetic levitation device of the present invention.

Referring now to FIG. 11, still other embodiments of the invention are shown wherein an electromagnetic 30, such as a wire conductor 32 formed into a polygonal (square) shape is used for the base magnet instead of a permanent magnet. On one side of electromagnet 30, the conductor 32 is bent downwardly to form closely spaced terminal ends 34, 36 across which a DC voltage is applied to create a magnetic field similar to the magnetic field of magnet 10 of FIGS. 5–9. A magnet top 40 which may be identical to top 13 is levitated above electromagnet 30 according to the same method described above in connection with FIGS. 5–9.

Optionally, another magnet 42 shown in dashed lines may be located at the geometric center E of electromagnet 30 for the same purpose as magnet 28 or hole 26 in the FIG. 10 embodiment. Magnet 42 may be a small electromagnet or a permanent magnet of circular, polygonal or other suitable shape with its field direction oriented opposite to the field direction of electromagnet 30.

Those skilled in the art will appreciate that using a stronger magnetic material or a stronger electromagnet will permit the use of a heavier top with a greater moment of inertia to thus reduce the stable spin rate and increase the levitation time of the system.

Although certain presently preferred embodiments of the invention have been described herein, it will be apparent to those skilled in the art to which the invention pertains that variations and modifications of the described embodiment may be made without departing from the spirit and scope of the invention. Accordingly, it is intended that the invention be limited only to the extent required by the appended claims and the applicable rules of law.

We claim:

1. A levitation device comprising:
   a first magnet having a first axis, a polygonal periphery and a substantially planar first surface, said first magnet being magnetized normal to said first surface and parallel to said first axis such that said first surface has a first polar orientation;
   a second magnet having a second axis and a second surface, said second magnet being magnetized normal to said second surface and parallel to said second axis such that said second surface has the same polar orientation as the first surface of the first magnet; and
   means for rotating said second magnet about the second axis whereby when said second magnet is rotated and disposed vertically above said first magnet with the first and second surfaces in confronting relation, said second magnet levitates over said first magnet.

2. The levitation device of claim 1, wherein the periphery of said first magnet is a square.

3. The levitation device of claim 1, wherein said first and second magnets comprise ceramic magnets.

4. The levitation device of claim 1, wherein said second magnet comprises a ring magnet having a central hole, the second surface being substantially planar, said rotating means comprising a spindle affixed in said central hole.

5. The levitation device of claim 4, including means for varying the weight of said second magnet to change the height above said first magnet at which said second magnet levitates.

6. The levitation device of claim 5, wherein said weight varying means comprises at least one washer having a central opening adapted to fit over said spindle.

7. The levitation device of claim 6, wherein said washer and said spindle are made of a nonmagnetic material.

8. The levitation device of claim 1, including a lifter plate made of a nonmagnetic material.

9. The levitation device of claim 1, wherein said first and second magnets are permanent magnets.

10. The levitation device of claim 1, including a bore disposed through the geometric center of said first magnet.

11. The levitation device of claim 1, including a third magnet having a third surface and being positioned adjacent the geometric center of the first magnet, said third magnet being magnetized normal to said third surface such that said third surface has a polar orientation opposite the polar orientation of the first surface of the first magnet.

12. The levitation device of claim 11, wherein said third magnet is an electromagnet.

13. The levitation device of claim 11, wherein said third magnet is a permanent magnet.

14. The levitation device of claim 1, wherein the first magnet is an electromagnet.

15. A method of levitating a magnet comprising the steps of:
    supporting on a horizontal surface a first magnet having a first axis and an upper surface, said first magnet being magnetized normal to said upper surface and parallel to said first axis such that said upper surface has a polar orientation;
    placing a non-magnetic lifter plate over the upper surface of the first magnet; placing a second magnet having a second axis and a lower surface on said lifter plate, said second magnet being magnetized normal to said lower surface and parallel to said second axis such that said lower surface has the same polar orientation as the upper surface of the first magnet;
    spinning the second magnet about the second axis while it is on the lifter plate; substantially aligning the second axis of the spinning second magnet with the first axis of the first magnet;
    raising the lifter plate vertically upwardly from the first magnet until said spinning second magnet levitates above the lifter plate and the upper surface of the first magnet; and
    removing the lifter plate from between the first and second magnets.

16. The method of claim 15, wherein said spinning step comprises manually spinning said second magnet.

17. The method of claim 15, wherein said raising step comprises manually raising said lifter plate and said removing step comprises manually removing said lifter plate.

18. The method of claim 15, wherein said first magnet has a polygonal periphery and said upper surface is substantially planar.

19. The method of claim 18, wherein said polygonal periphery is square.

20. The method of claim 15, including the step of placing a third magnet adjacent the geometric center of the first magnet, said third magnet having a polar orientation opposite the polar orientation of said first magnet.

* * * * *